Sept. 17, 1946.  J. O. McMILLAN  2,407,792
DIAPHRAGM PUMP
Filed Feb. 5, 1945  2 Sheets-Sheet 1

INVENTOR.
James O. McMillan
BY
ATTORNEY.

Sept. 17, 1946. J. O. McMILLAN 2,407,792
DIAPHRAGM PUMP
Filed Feb. 5, 1945 2 Sheets-Sheet 2

INVENTOR.
James O. McMillan
BY
ATTORNEY.

Patented Sept. 17, 1946

2,407,792

UNITED STATES PATENT OFFICE 2,407,792

DIAPHRAGM PUMP

James O. McMillan, Wichita, Kans.

Application February 5, 1945, Serial No. 576,294

4 Claims. (Cl. 103—150)

My invention relates, broadly, to improvements in diaphragm pumps and refers more particularly to improvements over my Patent No. 2,117,563.

In the pump disclosed in the patent and also in many conventional diaphragm pumps the diaphragms have a relatively short life and require frequent replacement if the pump is subjected to continuous use. Constant flexing of the diaphragm imposes upon its structure stresses which produce rapid deterioration and failure. Leaks frequently occur at the flexing portions, where the outer periphery of the diaphragm is sealed against the housing, and where the diaphragm is attached to the connecting rod. Where spring controlled valves are used they provide an additional source of trouble.

By my invention I have provided a simple, sturdy diaphragm pump, which efficiently and quietly pumps liquids and one which may be operated continuously over long periods of time without attention. My pump is easily assembled and disassembled for repairs or when replacement of parts are necessary by removal of two bolts which hold the abutting flanges between the pump head and crankcase.

I have found that placing the diaphragm within the pump housing under edgewise or radial compression substantially takes the diaphragm out of stress during the flexing operation or when the diaphragm is pulsated in the pumping operation. To provide stability and enlarged surfaces at the stationary or sealing portions of the diaphragm and lesser thickness and greater mobility at the flexing portions the thickness of the diaphragm is reduced between its central and peripheral stationary portions by grooving. Thus, structurally shaping the diaphragm assures more positive sealing at the connecting rod and between the periphery of the diaphragm and housing aided by sealing rings and provides a maximum of flexibility intermediate the seals where flexibility is required. The valves of my pump are operated by alternate compression and suction conditions within the pressure chamber without the aid of springs or other mechanical parts.

Figure 1:
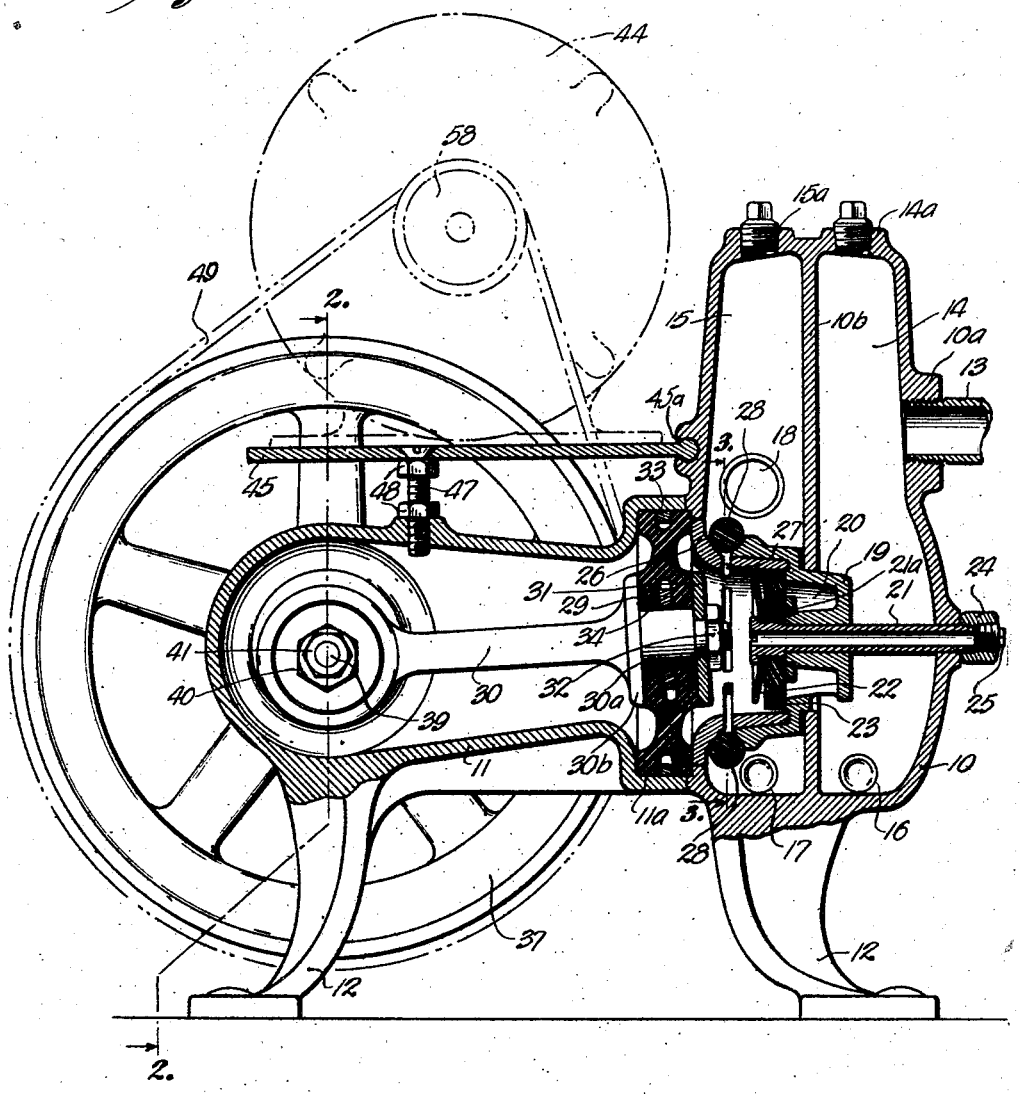
Figure 2:
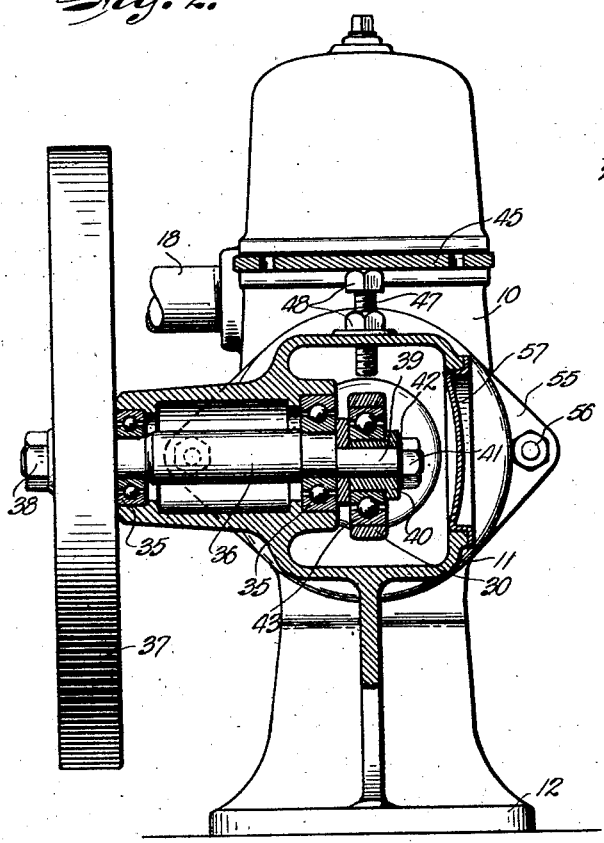
Figure 3:
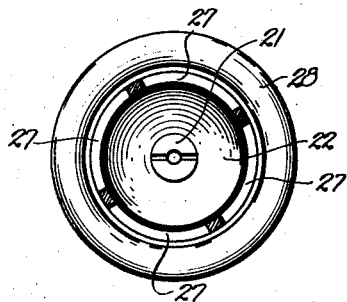
Figure 4:
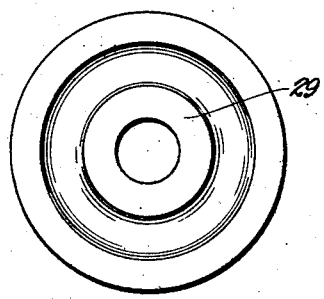
Figure 6:
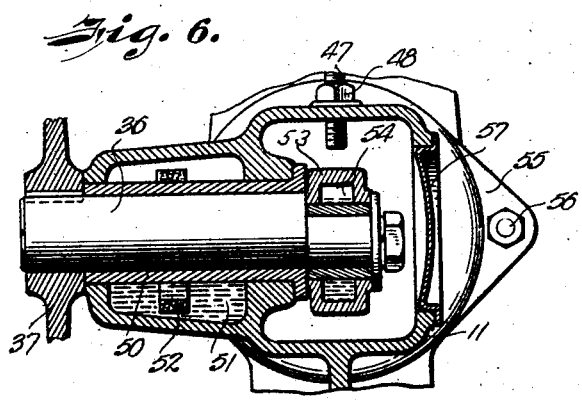
Figure 5:

In the accompanying drawings which form a part of the specification and are to be read in conjunction therewith and in which like reference numerals are used to indicate like parts in the various views, Fig. 1 is a cross sectional side view of a preferred embodiment of my invention, Fig. 2 is a view taken along the line 2—2 in Fig. 1 in the direction of the arrows, Fig. 3 is a view taken along the line 3—3 in Fig. 1 in the direction of the arrows, Fig. 4 is a face view of the diaphragm, Fig. 5 is a central sectional view of the diaphragm, shown in Fig. 4, and Fig. 6 is a view taken at the location of the line 2—2 in Fig. 1 in a pump having a modified bearing arrangement.

Referring to the drawings and particularly Fig. 1 there is shown a pump having a housing comprising a pump head 10, and a crankcase 11 supported by standards or feet 12. The pump head 10 has a threaded boss 10a into which is screwed a pipe 13 leading to a source of material to be pumped.

Within the pump head 10 is a vertical partition 10b which separates the head into a suction chamber 14 and an air or liquid discharge chamber 15. The chambers are equipped with drainage outlets 16 and 17 respectively and the air chamber has a discharge outlet 18. In the top of chambers 14 and 15 are removable plugs 14a and 15a respectively which are used in priming the pump. Positioned in an opening in the vertical partition 10b is a valve cage 19. A seal is effected between the valve cage 19 and the partition 10b by a gasket. The valve cage surrounds a valve chamber 20 and holding the valve cage in position is an air tube 21 which has a shoulder 21a abutting and holding in position the dome-shaped limiting disk 22. Between the limiting disk and the valve seat is positioned a flexible valve disk 23. This disk is preferably made of rubber, synthetic rubber or other resilient plastic material which will easily flex during the suction stroke of the pump and seat to form a liquid-tight chamber during the exhaust impulse of the diaphragm. The function of the limiting disk or bumper guard is to restrict the flexing of the valve disk during the suction impulse. The outer end of the air tube is threaded and extends through the pump head 10 where nut 24 is screwed to the air tube and abuts the pump head. Nut 24 serves to hold the valve assembly in position within the aperture in partition 10b and tightly against the gasket between the valve cage and the partition. A plug 25 is screwed into the nut or if desired a sniffer or check valve such as is used in pneumatic tires may be substituted for the plug.

Fitted between the valve cage 19 and pump head where the latter is joined to the crankcase 11 is an annular ring 26. This ring has perforations 27 about its periphery which serve as outlet ports from the pressure chamber which lies between flexible disk 23 and the diaphragm 29. Providing a closure for the outlet ports and positioned within a groove or trough surrounding the pressure chamber is an expandable or resilient ring 28.

The diaphragm is formed with a central aperture to receive the cylindrical end portion 30a of connecting rod 30. The central stationary portion of the diaphragm surrounding the connecting rod is clamped between flange 30b and a disk washer 31 held in place at the threaded end of the rod by a nut 32. The diaphragm is radially compressed and fitted into an annular recess 11a formed in the end of the crankcase. For example, a diaphragm having a diameter of 4½ inches is compressed into a recess whose diameter is 4¼ inches. The outer periphery of the diaphragm is therefore held when the pump is assembled between the crankcase, the pump head and the flared edges of the annular ring 26 which surrounds the pressure chamber. The outer periphery of the diaphragm and the inner surface of the aperture surrounding the connecting rod are grooved to receive seal rings 33 and 34. Ring 33 being in compression contacts the inner face of the recess formed in the flange assuring a liquid-tight fit between the diaphragm and the crankcase. Seal ring 34 is likewise resilient but is sprung inwardly toward the surface of the connecting rod and forms a liquid-tight seal between the diaphragm aperture and the rod assisted by the pressure imposed upon the diaphragm by nut 32 squeezing the diaphragm between the flange 30b and disk 31. A further important feature of the diaphragm, besides the manner in which it is sealed against the housing and connecting rod, is its shape. This is probably best shown in the cross sectional views in Figs. 1 and 5. It will be seen that the peripheral portion and the central portion surrounding the connecting rod are of greater thickness than the intermediate portion therebetween. This shape is obtained by circular grooves in the opposite faces of the diaphragm and provide the unusual and desirable results when the diaphragm is pulsated. In other words, the thick portions adjacent the periphery and connecting rod have wide sealing areas and are relatively stationary or rigid during flexing or pulsating of the diaphragm. The thinner portion of the disk intermediate the thicker peripheral and central portions provides less resistance to the oscillation of the connecting rod for two reasons, because of its lesser thickness and due to the fact that it is unreinforced by surrounding metal, as are the thickened portions.

Mounted in the crankcase in ball bearings 35 is a shaft 36. On one end of the shaft is a flywheel 37 held in place by a nut 38 and at the opposite end of the shaft and offset from its axis is a crank pin 39. An eccentric bearing sleeve 40 is held in place on the crank pin by a nut 41 and lock washer 42. A ball bearing 43 surrounding sleeve 40 supports the end of connecting rod 30. The amount of offset of the crank pin 39 from the axis of shaft 36 corresponds to the eccentricity provided by sleeve 40. Thus, the pulsations of the diaphragm produced by the connecting rod strokes may be adjusted from zero to a maximum throw by adjustment of the bearing sleeve. In other words, by positioning the sleeve on the crank in one position its eccentricity will offset that of the crank while, if rotated to a second position 180° from the first, a maximum eccentricity is obtained since the eccentricity of the crank is supplemented by that of the sleeve. Thus, the degree of flexing of the diaphragm and the stroke of the pump may be adjusted throughout an infinite number of settings from no pulsation of the diaphragm to a maximum.

To drive the pump a motor or other suitable source of power 44 is mounted upon a plate 45. This plate has a rounded edge 45a slidably fitted in a recess in the wall of discharge chamber 15 of the pump head. The free end of the plate is carried by screw bolt 47 threaded into the top of the crankcase and adjustable as to the height by nuts 48. Flexible belt 49 transmits power of the prime mover 44 to flywheel 37.

In the modified construction shown in Fig. 6 the ball bearings which support shaft 36 are replaced by a porous metal bearing sleeve 50. This bearing sleeve is surrounded by an oil reservoir 51 in which is a circular felt 52 which distributes the oil over the outer surface of the bearing. In this modification, ball bearing 43 at the end of the connecting rod is replaced by a porous bearing sleeve 53 which is oiled from a reservoir 54. This type of bearing when used in the pump offers continuous service over an extended period of time without oiling and the care which is necessary when the ball bearings are used.

It is also contemplated to use in either modification shown in Figs. 2 and 6 a shaft as shown at 36 which has a centered crank pin 39. In using this type shaft the stroke of the pump is adjusted by replacement of the eccentric 40 controlling the length of the stroke thereby.

The two parts of the pump housing, namely, the pump head 10 and crankcase 11, are joined at a flange connection 55, shown in Figs. 2 and 6. The flanges of the respective parts are held together by bolts 56 and to service or repair the pump it is necessary only to remove these two bolts. In the side of the crankcase is a removable plate 57 which permits adjustment of the eccentric sleeve 40.

To assemble the pump, assuming that the shaft 36 is mounted in the crankcase, the connecting rod adjusted on the crank pin, and the valve assembly mounted within the pump head, seal rings 33 and 34 are placed in their respective grooves in the diaphragm. The diaphragm is then mounted on the end of the connecting rod and the disk 31 drawn tightly against the diaphragm by means of nut 32. Diaphragm 29 is then radially compressed sufficiently to enter the recess 11a of the crankcase. While seating the diaphragm it is important to adjust the connecting rod by rotation of the flywheel to a position substantially midway of its longitudinal pulsation or stroke. The flanges 55 of the crankcase and pump head are then brought together and tightly sealed by drawing the flanges together with bolts 56. These bolts compress the peripheral edges of the diaphragm between the pump head and crankcase thus sealing the crankcase chamber from the pressure chamber of the pump. The length of the pump stroke or the degree of diaphragm pulsation is then determined by adjustment of the sleeve 40 on crank bearing 39 by removal of plate 57. The support plate 45 which carries the motor is then pinned to the pump head and the drive belt 48 in position upon the flywheel 37 and pulley 58 of the motor. Suction pipe 13 is connected to a liquid supply source and outlet pipe 18 to disposal equipment for the liquid discharged from the pump. Plugs 14a and 15a are removed and the pump primed. The plugs are then replaced and motor 44 started. During the suction stroke liquid is drawn into chamber 14 through pipe 13 and as suction pressure is imposed upon the pressure chamber disk valve 23 is flexed permitting the liquid to pass the valve into the pressure chamber. After passing dead center and on the discharge stroke or pulsation of the diaphragm disk valve 23 is seated and the liquid in the pressure chamber forced out through ports 27. Pressure of the liquid passing through these ports moves expandable ring 28 from its seat in the annular groove surrounding the pressure chamber and permits the liquid to flow into air chamber 15. From the chamber 15 the liquid passes through discharge pipe 18 completing the cycle.

When the pump is used in a water system which has a storage tank, it is necessary that provision be made for a cushion of air in the top of the tank to regulate the flow of water between a low cut-in pressure and a high cut-out pressure. To prevent the tank from waterlogging air must be pumped into the tank with the water automatically or supplied at intervals. This is preferably done by screwing a check or sniffer valve in place of the plug into the end of air tube 21. Such a valve allows a small amount of air to enter with the water into the pressure chamber at each stroke of the pump. When the pump is operated in a system not utilizing a storage tank the sniffer valve may be dispensed with and the end of the air tube plugged.

From the description, it will be obvious that there is provided a simple, rugged type of diaphragm pump admirably adapted for the pumping of liquids of all kinds, a pump which needs little servicing or attention over extended periods of time and provided with a valve mechanism needing little or no attention on account of failure of operating parts. The diaphragm being under radial compression has considerably longer life than the conventional type of diaphragm used on conventional pumps. The shape of the diaphragm provides rigid easily sealed surfaces at the stationary portions and a thinner cross section more susceptible to the action of the pump's pulsation in the flexing action.

To accommodate some of the structural advantages there are listed below features which have been added and objectionable features in conventional pumps which have been dispensed with:

1. Assembly with two bolts.
2. Omission of the usual packing gland.
3. Dispensing with valve springs.
4. Attaching of the motor directly to the support plate does away with motor bolts.
5. Special oil bearings in the modified construction reduces oiling difficulties.
6. Capacity varied by adjusting eccentric sleeve 40.
7. Diaphragm under radial compression assures long life.
8. But two gaskets used in the pump assembly.
9. Quiet operation occasioned by the character of the moving parts.
10. Design compact and neat in appearance and providing quality and low cost.
11. Ease of repair and replacement of parts.

From the forgoing it will be seen that my invention is well adapted to attain the objects hereinbefore set forth together with other advantages which are obvious and which are inherent to the pump.

As many possible embodiments may be made of the invention without departing from the scope thereof it is understood that all matter herein set forth is to be interpreted as illustrative and not in a limiting sense.

Having thus described my invention, I claim:

1. In a diaphragm pump the combination with a pump housing of a pressure chamber therein having inlet and outlet ports, valves for said ports, an annular flexible diaphragm disk having circumferential exterior and interior grooves, seal rings in the grooves, said diaphragm mounted in the housing under radial compression and oscillating means connected into its central aperture for pulsating the diaphragm to pump fluid through the pressure chamber said seal rings cooperating with the housing and oscillating means to seal the pressure chamber at the diaphragm.

2. In a diaphragm pump the combination with a pump housing of a pressure chamber therein having inlet and outlet ports, valves for said ports, a flexible diaphragm mounted in the housing under radial compression, oscillating means for pulsating the diaphragm to pump fluid through the pressure chamber and ring sealing means between the housing and diaphragm.

3. A pump as in claim 1 in which the inlet valve includes centrally supported flexible and dome-shaped disks mounted in the pressure chamber, the convex surface of the dome-shaped disk adjacent the flexible disk and limiting its maximum flexing during the functioning of the valve.

4. In a diaphragm pump the combination with a pump housing including a pressure chamber and crankcase, inlet and outlet ports for the pressure chamber, valves controlling said ports, a flexible diaphragm mounted under radial compression in the housing between the pressure chamber and crankcase, oscillating means for the diaphragm located in the crankcase, a connecting rod between the diaphragm and the oscillating means, seal rings surrounding the diaphragm and connecting rod to effect a seal at the diaphragm between the pressure chamber and crankcase.

JAMES O. McMILLAN.